Feb. 23, 1954  R. M. PATERSON  2,670,089
SWEEP OR LIKE ATTACHMENT FOR TRACTORS
Filed Oct. 26, 1948  6 Sheets-Sheet 1
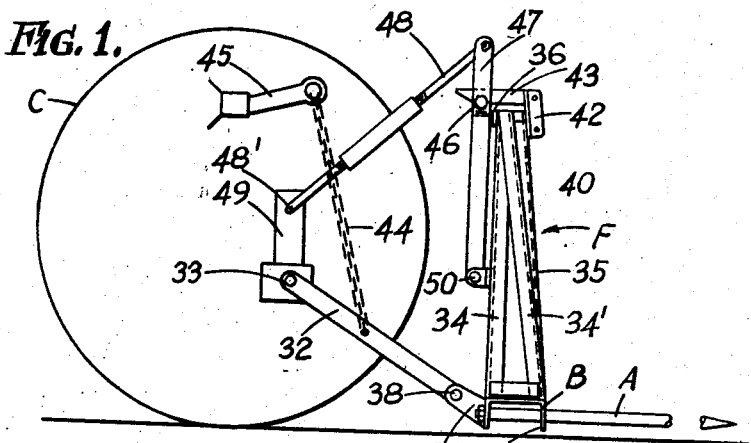
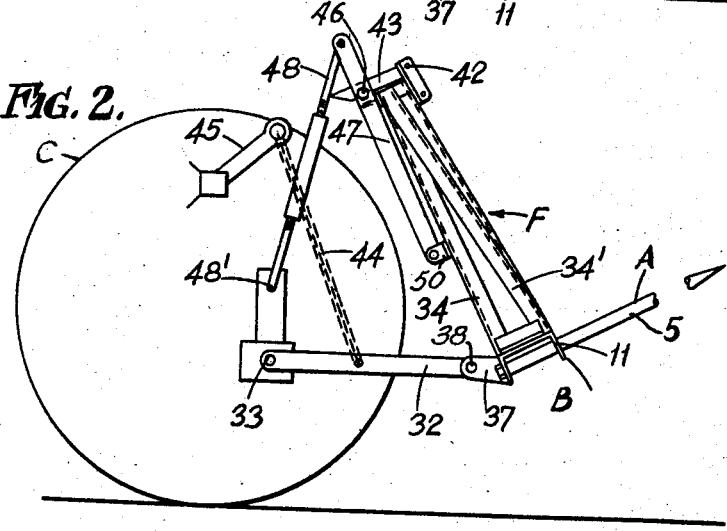
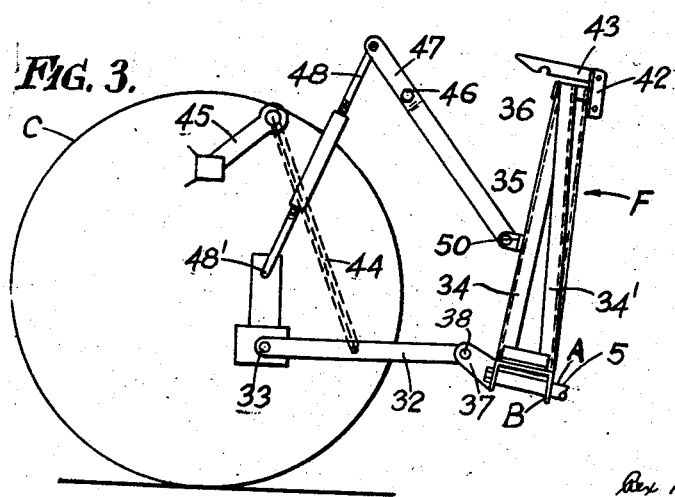
Inventor:
Rex Munro Paterson;
By his attorneys,
Baldwin, Wight, & Prevost

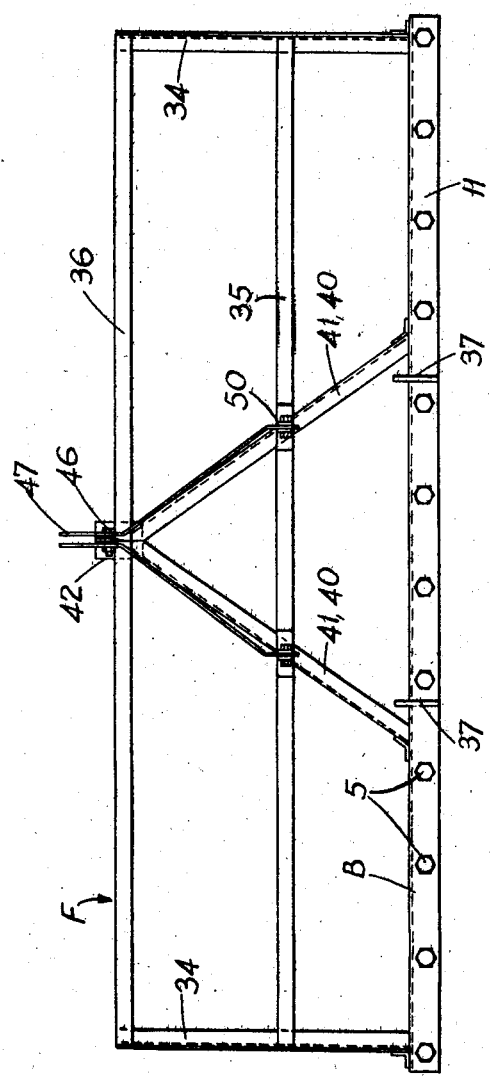

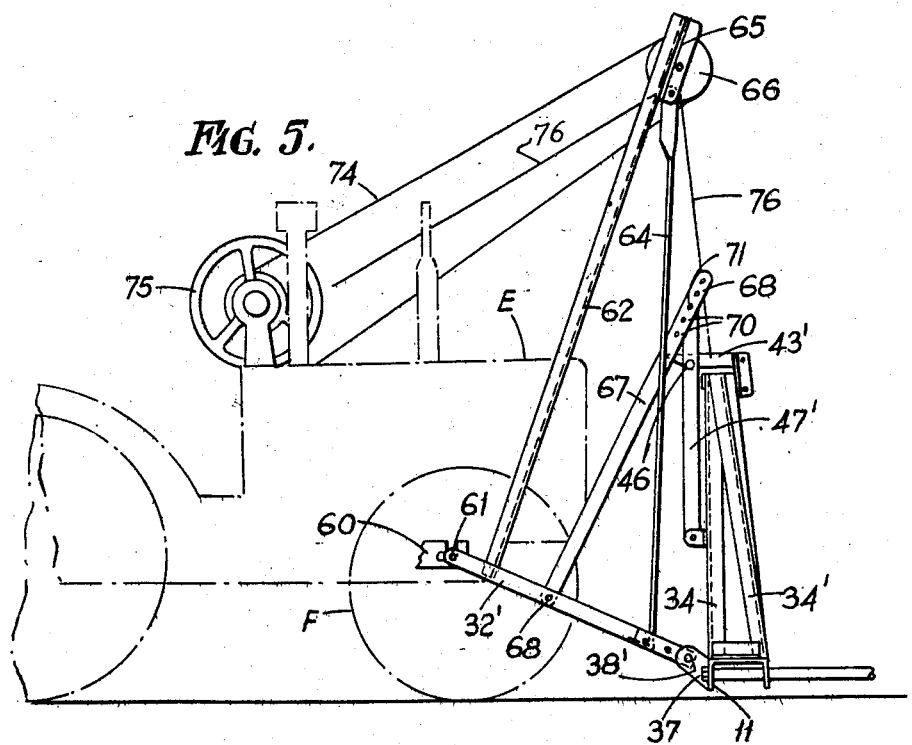
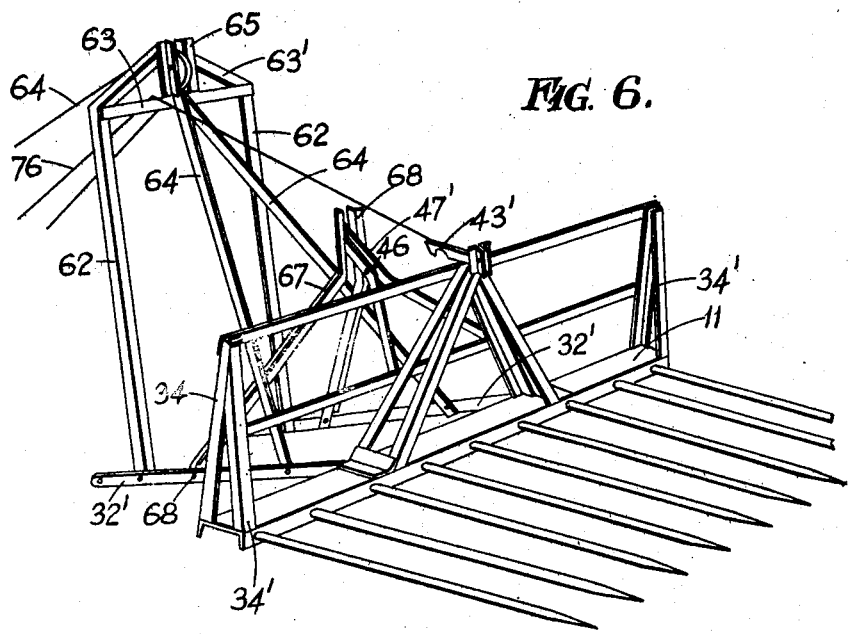

Feb. 23, 1954     R. M. PATERSON     2,670,089
SWEEP OR LIKE ATTACHMENT FOR TRACTORS
Filed Oct. 26, 1948     6 Sheets-Sheet 4

Inventor:
Rex Munro Paterson,
By his attorneys,
Baldwin, Wight, & Prevost

Feb. 23, 1954   R. M. PATERSON   2,670,089
SWEEP OR LIKE ATTACHMENT FOR TRACTORS
Filed Oct. 26, 1948   6 Sheets-Sheet 5
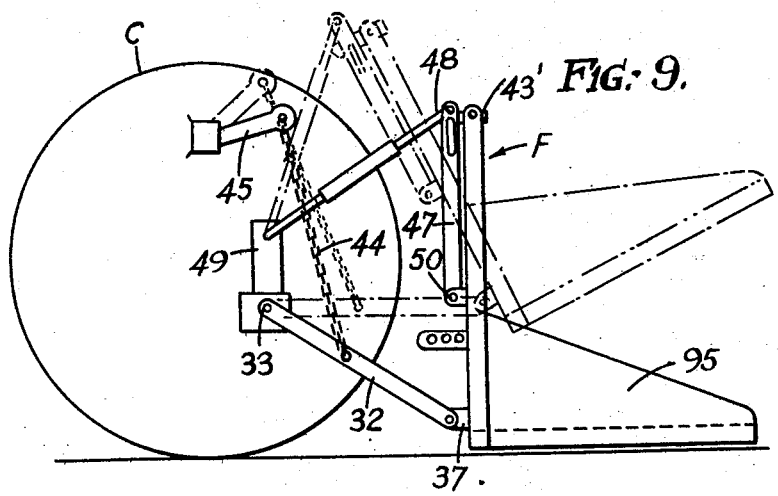
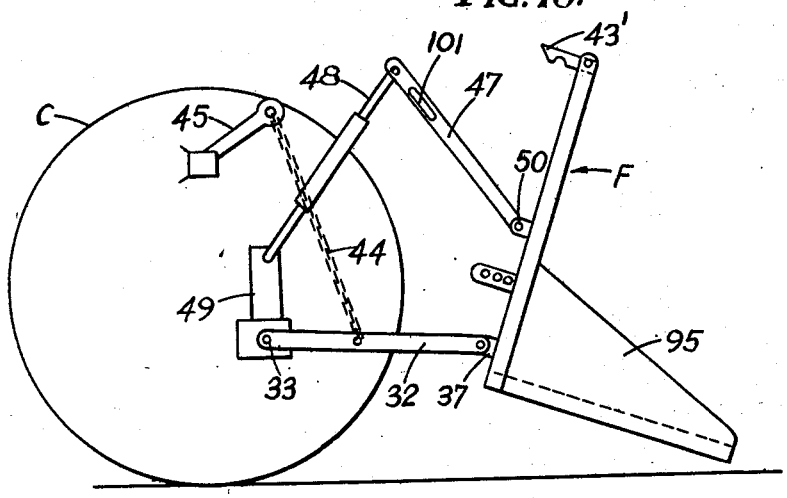

Feb. 23, 1954   R. M. PATERSON   2,670,089
SWEEP OR LIKE ATTACHMENT FOR TRACTORS
Filed Oct. 26, 1948   6 Sheets-Sheet 6
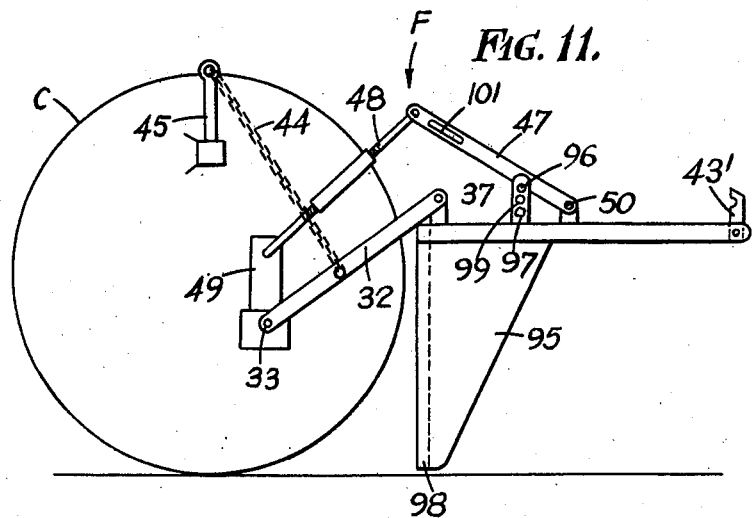
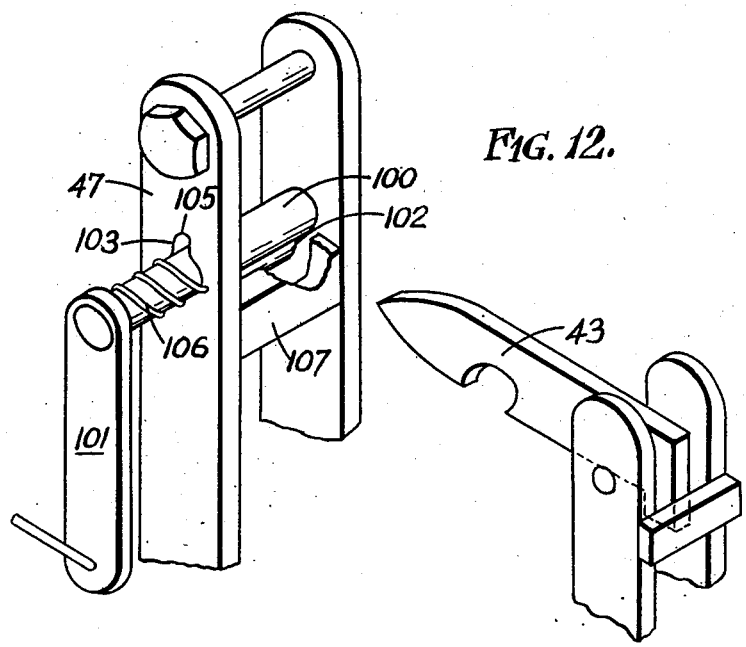

Patented Feb. 23, 1954

2,670,089

UNITED STATES PATENT OFFICE 2,670,089

SWEEP OR LIKE ATTACHMENT FOR TRACTORS

Rex Munro Paterson, Cliddesden, Basingstoke, England

Application October 26, 1948, Serial No. 56,611

Claims priority, application Great Britain October 31, 1947

11 Claims. (Cl. 214—140)

This invention relates to a farming implement and more particularly to an attachment for a tractor or truck capable of use as a sweep or scoop for levelling or dirt moving.

As applied to a grass or hay sweep the invention is concerned with that type of machine having an attachment comprising a number of tines mounted horizontally to pick up the grass and the invention has for its main object a machine capable not only of picking up the grass or hay but of handling and dumping it.

Another object of the present invention is an attachment for use on tractors having what is known as a three point suspension intended for attachment of plough and other farming implements. The standard three point suspension as incorporated in the "Fordson" and "Ferguson" tractors is provided by three lever arms, pivotally anchored to the chassis at the rear, an upper and central arm and two lower arms. This is additional to the power lift or other take off which is driven from the engine.

According to the present invention a sweep or scoop device for use as an attachment on or forming part of the equipment of a tractor or similar vehicle comprises a sweep or other tool carrying frame hingedly mounted on supporting arms, termed lift arms which arms may or may not form a part of the tractor and are pivotally attached to the chassis of the tractor so as to be capable of swinging about an axis adjacent to and parallel with the front or rear wheel axis, means connecting said frame to another point on the chassis so as to permit limited angular movement, said means including a latch device which normally holds the tool frame fixed to rise and fall with the lift arms but which can be released to drop the tool frame when required and means connecting the lift arms with hoisting mechanism, e. g. the power lift on the chassis.

The second point of connection may be provided by other lever arms on the chassis of the tractor, to which the tool frame is connected by links, or where the device is used as an accessory and lift arms are fitted to the tractor or to the chassis of a truck, the second point of connection is provided by uprights fast with the lift arms.

In the case of a tractor having a three point suspension, the tool frame is pivotally attached to the lift arms on the chassis that form part of the suspension, the power lift being coupled directly to the lift arms.

Preferably the latch consists of a drop lever having a notch on its underside to engage a detent on the subframe on the tractor to which the tool frame is attached. So that the engagement action of the latch may be automatic, the end of the latch lever is formed with a striker beak to enable the latch to ride over the detent and re-engage automatically on lowering of the subframe following release of the main frame to discharge a load. The latch lever may be mounted on a bracket on the top bar of the back rack.

The main frame as applied to a grass sweep may consist of a cross bar, to which the sweep tines are fixed, the bar supporting a back rack against which the grass being collected by the tines will pile up. The back rack may consist of two outer and two inner verticals being central and in alignment with the two lower points of suspension so that they coincide and give the necessary strength at the hinge points of the main frame.

According to a further feature of the invention, as applied to a scoop device in which the tool frame is fitted with a scoop or shovel capable of being maintained in a position where the shovel can be used for shovelling earth or muck after the manner of a bulldozer.

The invention is illustrated in the accompanying drawings in which:

Figures 1, 2 and 3 are side elevations of a sweep device for direct attachment to the rear of a tractor and showing the sweep respectively in its operative, raised and dumping positions.

Figure 4 is a view from the rear showing the attachment separate from the tractor. Figure 5 is a side elevation of a modified form of the sweep device of Figures 1–4 but adapted for attachment to the front of a tractor and showing the sweep in its operative or ground position. Figure 6 is a perspective view showing the sweep with the main frame or support arms elevated but with the sweep proper released.

Figures 9 and 10 are side elevations of a scoop device and show the device in operative and dumping positions.

Figure 11 is a view showing the scoop in position for bulldozing.

Figure 12 is a detail perspective view.

Figure 7:
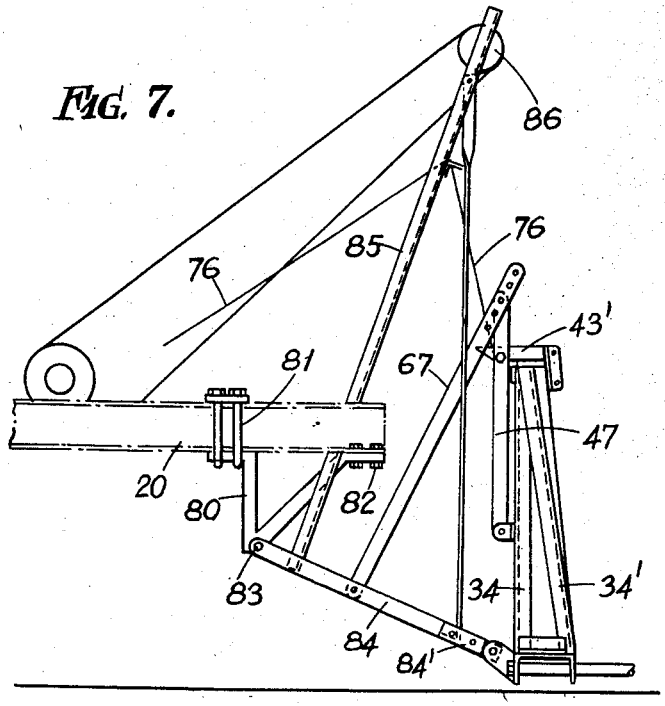
Figure 7 is a side elevation showing an alternative form of rear mounting for use on a "quad" type vehicle or a truck and incorporating the design of sweep shown in Figures 1–6.

Referring to the drawings A indicates generally a number of tine bars carried by a transverse beam B forming part of a tool frame F, the whole being mounted on a tractor of which the rear wheels only are shown being denoted by C.

The sweep attachment of this invention essentially comprises a main frame which in the embodiment illustrated is built up of a transverse bar 11, conveniently constructed of an inverted channel section. Welded or otherwise secured to the bar 11 are uprights 34 connected by transverse bars 35, 36 to form a back rack or grid against which the grass or hay is collected by tines 5 secured to the tool bar 11. The tines 5 it will be noted are detachably secured to the bar 11 by screw nuts, so that when worn they can be replaced.

Attaching brackets 37 are provided on the tool bar 11 for hingedly connecting the attachment as a unit to the tractor, the brackets being provided with holes to receive fastening pins 38, on lift arms 32, which usually form part of the tractor equipment and are pivotally mounted on the tractor chassis B to rock about trunnion centres 33 located below the wheel axle.

Third attaching brackets 50 are provided on the back rack to which is pivotally anchored a linkage shown in the form of a latch arm 47, the free end of the arm 47 serving as the third point of attachment to the tractor being connected to a guide member in the form of an adjustable tie rod 48, which is mounted on the chassis frame B to rock about a centre 48¹ that is above the wheel axle and central and mounted on a crossbar 49 attached to the tractor. Adjacent the brackets 37 the longitudinals 35, 36 are braced by front and rear pairs of angle straps 40, 41 to which are secured brackets 42 mounting a latch arm 43 for engagement with a catch pin 46 mounted between bifurcated ends of the said linkage or latch arm 47.

The latch 43—46 is normally in its engaged or operative position to hold the attachment rigid with its latch arm 47 so that the parts 11, 34 lift arms 32, 48 will be relatively fixed.

Thus by raising or lowering the arms 32, which for this purpose are connected by chains 44 to the power actuated lever arm 45, the tool frame can be raised from its ground or operative (sweeping) position (see Fig. 1) to the raised position (Fig. 2), when by releasing the latch 43 the tool frame is free to pivot about its centres 38 (Fig. 3) to discharge its contents.

It will be seen that by reason of the hinge 38 a certain amount of float is permitted to the tines when moving over the ground, the swinging movement of the tool frame being limited in one direction by means of a wood block 31 secured between the members 9.

In operation the tractor with the sweep attached is driven backwardly to collect grass or hay in the sweep, the main or tool frame F being in a position where the back 34—35—36 (Figure 1) is vertical with the tines horizontal so as to operate in the manner of a comb. When the sweep is full the power lift is brought into operation to lift it to the elevated position and the tractor driven up to the silage pit, where the latch is released allowing the main or tool frame to drop about its hinge 38 whatever be the position of the back wheels and so dump the load. The main or tool frame is now dropped, and the latch parts will automatically re-engage as soon as the main or tool frame F is allowed to fall by the operator by reason of the tines which now engage the ground, operating to hold the said frame F against further movement and thereby assist in bringing the two parts of the latch together.

In its elevated position, the angle of the tines is preferably such that the rake is at an inclination to the ground (horizontal) with the tines tilted upwardly; this ensures that the rake will pick up a full load and is dependent on the position of the points of connection of the brackets 37 and latch arm 47 with the tractor.

While intended primarily for use as a silage (green grass) or hay sweep, a scoop or grading shovel may be fitted to the tool frame for soil moving or ground levelling, the scoop or shovel being fixed to the tool bar 11 or being attached in its place.

In the construction shown in Figs. 1 to 4 the sweep is intended for attachment to the rear of the tractor so that the power lift can be utilised to raise and lower the sweep proper. In certain cases, however, it may be preferred to mount the sweep at the front of the tractor where the operator will have better control and vision.

Referring now to Figs. 5 and 6, F indicates the front wheels of a tractor, E being the engine and radiator assembly. For the purpose of this invention the chassis of the tractor is fitted with attaching brackets 60 conveniently secured to the front axle and to which the sweep device is secured. The sweep device essentially comprises support arms 32' similar to the arrangement of Figs. 1 to 4, on which the tool supporting frame 34, 34' and tool bar 11 is pivotally mounted by means of brackets 37 as in the previous construction. So that the sweep can readily be attached and detached, the brackets 60 are provided with L slots to receive mounting studs 61 on the support arms 32'.

Fast with the support arms 32' are vertical arms 62 joined to one another at the top by cross stays 63, 63' as can be seen in Fig. 6. The arms 62 are braced by long tie bars 64 anchored at their top ends to a double vertical stay 65 mounting a hoisting pulley 66. The tie bars 64 thus transfer a direct pull from the stay 65 to the forward ends of the support arms 32'.

The tool bar 11 and its associated frame 34, 34' is hingedly attached to the front ends of the support arms 32' at 38' as in the previous construction and the control of the frame is by means of an adjustable tie rod element corresponding to the tie rod 48, but slightly modified, and consisting of bifurcated straps 67 pivotally attached on their lower ends at 68 to the support arms 32'. At their upper and outer ends the straps 67 are formed with parallel portions which connect to form a saddle indicated generally at 68 in the sides of which are a series of holes 70 for a fixing pin 71. The pin 71 pivotally secures the bifurcated lift arms 47' to the tie straps 67 and by reason of the holes 70 provides a certain amount of vertical adjustment.

A latch arm 43' is provided centrally and at the top of the frame 34 for releasable engagement with a catch pin 46 mounted between the arms 47'.

Figure 8:
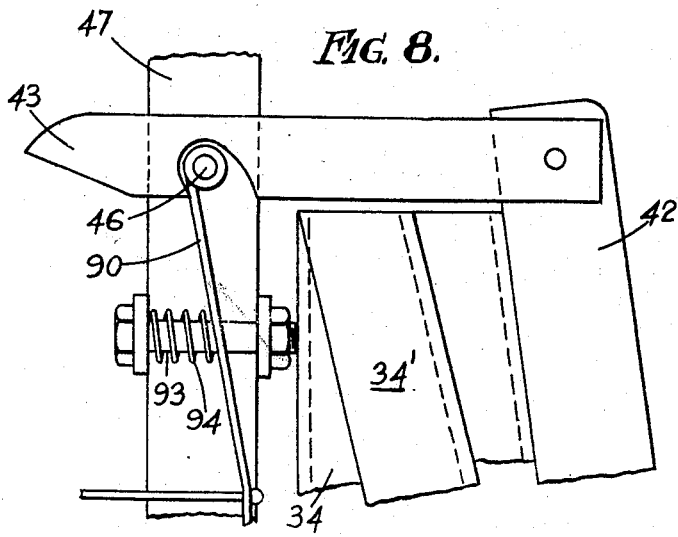
Figure 8 is a detail view of the latch mechanism.

The arms 32' are raised and lowered by means of the lever arm frame 62, 64, the operator transferring a direct pull to the upper end of the arms 62 by means conveniently of a pulley tackle and mechanism indicated generally at 74 operated by a hand wheel 75 which is arranged conveniently to the right of the steering wheel of the tractor. Release of the latch arm 43' is by means of a trip cord 76 which is passed upwardly over the cross bar 63 and carried back to a point conveniently for operation by the driver. The trip cord may operate the latch arm 43' or the striker pin 46 as shown in Fig. 8. In the Fig. 8 construction the trip cord is secured to one end of a crank member in the form of a blade 90 and mounted at its other end to rock about the pin 46. A bolt 93 secured between lugs on the latch arm 47 carries a spring 94 which normally holds the blade member 90 against displacement and the inclined slot in the latch element 43 is held by pin 46. On pulling the cord the crank member 90 will be displaced to an extent which is sufficient to lift the latch 43 off the pin 46.

It will be obvious that in place of a hand lift, i. e. wheel 75, some form of power lift may be provided but the operation remains substantially the same as the construction shown in Figs. 3 to 5.

Assuming that the operator has dumped his load the support arms 32' will be in their elevated position as is clearly shown in Fig. 6, the operator having previously hauled on the frame 62 through the pulley mechanism 74, 75. Having raised the arms 32' the operator pulls on the release or trip cord 76 thereby lifting the latch 43' to disengage when the sweep proper including the tool bar 11 and frame 34 will drop downwardly pivoting about anchorage 36 on the arms 32' to discharge the contents of the load. The parts are now as shown in Fig. 6. All the operator now has to do is to rotate hand wheel 75 in the opposite direction to allow the frame 61 with the arms 32' to drop to the position shown in Fig. 5 when the latch 43' will re-engage with its associated pin 46'.

It will be obvious that the frame 34 and bifurcated arms 47' and the strips 67 function in the manner of a toggle capable of release by the operator as and when desired, to discharge the load.

Referring now to Fig. 7 there is shown a further modification in which the means of attaching the sweep to the truck chassis 20 comprises V-brackets 80 bolted by straps 81 and clip bolts 82; supported by the brackets 80 is a cross bar 83 mounting lever arms 84 corresponding to the support arms 2, 32 and to which the lugs 37 are directly secured, or, as shown, to extension pieces 84' which permit of adjustment and to which lugs 37 are secured. Fast on the lever arms 84 are verticals 85 fitted with a hoisting pulley 86. The tool frame 34 with the frame 67 and links 47 are similar in construction and operation to the arrangement of Figs. 5 and 6.

Referring now to Figures 9–12, the tool frame F in place of tines has attached to it a scoop or shovel 95 for use in handling muck, loose earth and the like.

The subframe F differs in construction from the arrangement shown in Figures 1 to 8 in that the inclined uprights 34' are eliminated as it is found that they are unnecessary since the sides of the scoop provide sufficient bracing effect. Otherwise the construction of the subframe F comprising latch 43', bracket arms 37 together with its pivotal connection 50 remains the same, the entire unit being supported from the tractor by lift arms 32 and linkage 48, 47. In normal use, the scoop is used in the lowered position shown in Figure 9; when full it is raised by the power lift until it assumes the dotted line position of Figure 9 and driven to a dump; on release of the latch by the driver, the scoop falls to the Figure 10 position to dump its contents.

To enable the scoop to be used for shifting earth, similar to the action of a bulldozer, the verticals 34 of the subframe may, as shown in Figure 11, be fitted with a cross bar 96 mounted in short arms 97, the cross bar 96, when the tractor is backed and the latch 43' tripped as for dumping, has the effect of driving the forward edge of the shovel into the ground. The reaction due to the shovel engaging the ground will cause the bottom plate 98 of the shovel to pivot about its edge and thus the arms 32 to lift until arrested by engagement of the cross bar 96 with the underside of the tie bars 47. In this position the bottom plate 98 of the scoop is vertical and can be used in the manner of a bulldozer. The arms 97 may be provided with three sets of holes as indicated at 99 so that the position of the cross bar and thus the limit position of the shovel can be adjusted to suit working conditions.

Referring now to Figure 12 instead of the latch shown in Figure 8 there is provided releasing means including a rockable pin 100 having a short crank 101 at one end. On the pin 100 is a rib 102, which operates as a cam to release the latch arm 43 when the pin is rocked by its crank 101 by the operator. Pin 100 is detachably mounted in keyhole shaped holes 103 cut in the links 47, the slotted portion 105 of each hole being on the upper side so as to be angularly displaced in relation to the operative position of the pin as shown in Figure 12. The keyhole slot enables the pin to be quickly fixed in position and when in position it is held by the rib which is now opposite the slot. A spring 106 urges the pin in an anti-clockwise direction against a limit stop 107. It will be obvious that by pulling the crank arm 101, it will rock the pin in a clockwise direction when the rib will strike the latch 43 and so release it from engagement therewith.

The term "tractor" used in the specification and claims appended is to be read as including any power driven vehicle, to which the sweep or scoop attachment of this invention may be secured.

What I claim is:

1. An attachment for a tractor comprising a main frame including a transverse tool bar having a back rack, brackets on the main frame adapted for pivotal attachment to a relatively upper and lower guide and lift members on the tractor, a latch arm, releasable latch parts carried by said frame and latch arm, said latch arm being pivoted at one end to one of the brackets of the main frame below the top of the latter and above the point of pivotal attachment of said lower lift member thereto, said main frame and latch arm being normally secured against relative movement by said releasable latch parts so that said main frame can be raised and lowered by movement of said lift member, the upper guide member being pivotally connected to the other end of said latch arm, and said upper guide member being a tie arm adapted for pivotal connection to the tractor.

2. The attachment claimed in claim 1 in which the frame has spaced arms mounting a pin and in which the said latch means comprises a trip lever pivotally mounted on said pin, said pin being a rock pin and having an arm for operating the same to release the trip lever, said pin having a striker face to engage the trip lever so that rotation of the pin will effect the said release of the trip lever, and means provided with a key-hole shaped slot for mounting the lock pin.

3. The attachment claimed in claim 1 wherein the frame is provided with a shovel in which the linkage connecting the frame to the chassis includes a stop bar for engagement by the shovel in one of its operative positions.

4. The attachment as claimed in claim 1 in which the distance separating the points of connection between the latch arm and the main frame and the tractor disposes the tool at an upward angle in its elevated position.

5. The attachment claimed in claim 1 in which the frame has spaced arms, the said latch parts comprising a pin and a trip lever to engage said pin, said pin being rockably mounted by said spaced arms, and said pin having means to disengage the latch through rocking of the pin.

6. A structure of the class described having a lift arm, a guide arm and a latch arm foldably connected and disposed above the lift arm in downwardly diverging relation, means pivotally connecting the latch arm to said structure for swinging of the structure by the said lift arm toward and away from said foldable connection, said guide arm being adapted for pivotal mounting with respect to a vehicle, said lift arm being pivoted to said structure below said means adapted for operative mounting with respect to the vehicle, and latch means above said first means to secure said structure and latch arm together against unfolding movement comprising a coacting trip lever and detent carried by the structure and the latch arm for automatic engagement when the structure is lowered.

7. A dumping structure of the class described comprising a generally upstanding frame, a lift member for movable attachment to said frame adapted to be pivotally attached to a vehicle for raising and lowering by lift mechanism of the latter, a latch arm pivotally connected to said frame above the said pivotal connection of the lift member thereto, a guide arm, said latch arm being pivotally connected to the guide arm above the pivotal connection of the latch arm to said frame, said latch arm and guide arm being disposed in downwardly diverged relation, said guide arm being adapted for connection in spaced relation to the last-mentioned connection and to a vehicle, latch means to secure said frame and latch arm together against relative unfolding movement, the said connections enabling the structure to be swung on the latch arm toward and away from the pivotal junction of said latch arm and guide arm to dump outwardly away from the structure, said latch means comprising spaced elements on the frame, a pin mounted by said elements, a trip lever pivotally mounted on said pin, and a detent on the latch arm to automatically reengage with the trip lever when the structure is lowered.

8. An attachment for a tractor having a lift arm pivotally connected thereto and power means operatively connected from above to said lift arm intermediate the ends of the lift arm comprising a relatively high tool frame having a lift tool at the base thereof and which frame is disposed approximately vertical in operative position, said lift arm being pivoted to said tool frame and extending angularly downwardly and rearwardly in said position, a guide arm pivoted to said tool frame intermediate its top and bottom and in said position being approximately vertical, a latch adjacent the top of said frame, catch means on said guide arm engaged by said latch in the said position, a tie rod means in downwardly diverging relation to said guide arm and pivoted to the latter adjacent the top thereof and adapted for pivotal connection adjacent its lower end to the tractor, the lifting of the lift arms with the latch engaged with the catch means serving to move the tie rod means and guide arm closer together at their lower ends to incline said tool frame with its upper end closer to the tractor, the release of the latch in the latter position of the frame enabling the tool frame to swing away from the tractor past the vertical to facilitate discharge from the tool.

9. A sweep attachment for a tractor comprising a main frame including a transverse tool bar having an upstanding back rack, transversely spaced brackets on the main frame adapted for pivotal attachment to a relatively upper and lower guide and lift arm on the tractor and adapted to be power-operated from the tractor, an approximately centrally located latch arm pivoted at one end to the main frame at a location below its top and above the brackets, a releasable latch means normally securing said latch arm to the main frame comprising a pivotal trip arm on the main frame and a detent on the latch arm, a tie arm adapted to be mounted pivotally on the tractor, said tie arm being pivotally connected to the other end of the latch arm so that the attachment can be raised or lowered by movement of the lift arm and a load discharged by release of the trip arm, the trip arm being automatically re-engageable with the detent when the latch arm is returned to its normal position.

10. A sweep attachment for a tractor comprising a horizontal tool bar, uprights fast on the tool bar providing a back rack, transversely spaced brackets on the tool bar for pivotal connection to lift arms on the tractor, a latch arm pivotally attached at one end to the back rack at a point above said brackets, a tie arm adapted to be secured pivotally on the tractor pivotally connected to the other end of the latch arm, and a releasable latch means comprising a trip lever mounted on the frame and a detent mounted on the latch arm to normally hold the back rack rigid with the latch arm so that, until released, the attachment can be raised or lowered with the tractor lift arms, and when released the load will be discharged, the latch means automatically reengaging through lowering movement of the attachment.

11. The sweep attachment claimed in claim 10 having end members in the form of uprights, and a center means mounting the latch arm.

REX MUNRO PATERSON.

References Cited in the file of this patent

UNITED STATES PATENTS

| Number | Name | Date |
|---|---|---|
| 2,372,903 | Messing | Apr. 3, 1945 |
| 2,385,987 | Henry | Oct. 2, 1945 |
| 2,397,046 | Richey | Mar. 19, 1946 |
| 2,398,585 | Hayward | Apr. 16, 1946 |
| 2,413,095 | Barker | Dec. 24, 1946 |
| 2,446,827 | Hall | Aug. 10, 1948 |
| 2,449,212 | Fraga | Sept. 14, 1948 |
| 2,472,194 | Cook | June 7, 1949 |
| 2,482,286 | Mott | Sept. 20, 1949 |
| 2,538,102 | Keeler | Jan. 16, 1951 |
| 2,538,505 | Carter | Jan. 16, 1951 |